United States Patent [19]
Giles et al.

[11] Patent Number: 5,871,112
[45] Date of Patent: *Feb. 16, 1999

[54] SYNTHETIC REPLACEMENT FOR PULPBOARD IN WAXBOND INNERSEALS

[75] Inventors: Joseph M. Giles, Secor; Steven A. Brucker, Gibson City; William J. Bennington, Normal, all of Ill.

[73] Assignee: Selig Sealing Products, Inc., Forrest, Ill.

[*] Notice: This patent issued on a continued prosecution application filed under 37 CFR 1.53(d), and is subject to the twenty year patent term provisions of 35 U.S.C. 154(a)(2).

[21] Appl. No.: 642,576

[22] Filed: May 3, 1996

[51] Int. Cl.⁶ .............................. B65D 53/04; B65D 53/06
[52] U.S. Cl. ........................... 215/347; 215/348; 215/349
[58] Field of Search .................................... 215/347, 349, 215/350, 351, 341, 346, 348; 220/378

[56] References Cited

U.S. PATENT DOCUMENTS 4,684,554  8/1987  Ou-Yang .............................. 215/349 X
5,176,271  1/1993  Painchaud et al. ................ 215/350 X
5,381,914  1/1995  Koyama et al. .................... 215/348 X

*Primary Examiner*—Stephen Castellano
*Assistant Examiner*—Niki M. Eloshway
*Attorney, Agent, or Firm*—Hill & Simpson

[57] ABSTRACT

An innerseal is provided for sealing against the lip of a container opening under a cap. The innerseal includes a resiliently-compressible porous synthetic backing layer which fits within the cap, a foil layer, and a wax layer which initially holds the foil and backing layers together. Preferably, a heat-activatable adhesive layer is disposed against the foil layer. The cap is tightened so that the foil layer is pressed against the lip of the container opening. Then, heat is applied to melt the wax and to activate the adhesive layer. This molten wax is absorbed into the synthetic backing layer so that the backing layer and foil layer are separatable by a twisting of the cap. The synthetic backing layer provides improved strength and liquid resistance characteristics over pulpboard type seals, and is cuttable with less dust.

13 Claims, 1 Drawing Sheet

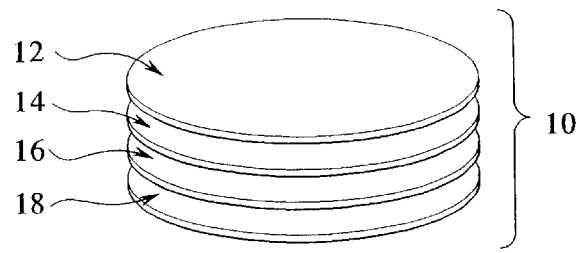
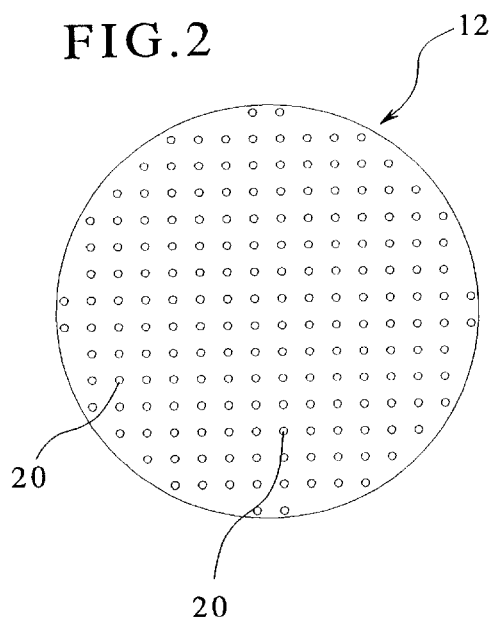
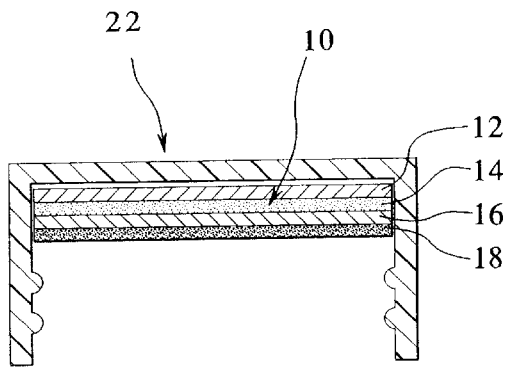
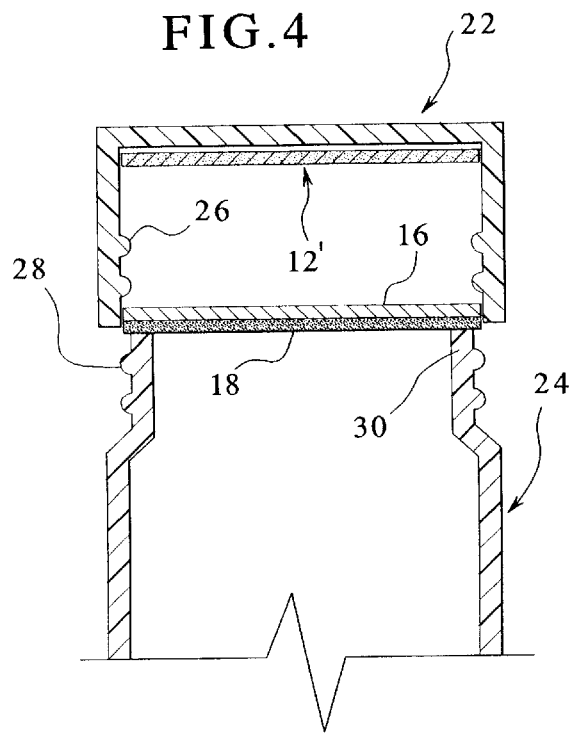

SYNTHETIC REPLACEMENT FOR PULPBOARD IN WAXBOND INNERSEALS

BACKGROUND OF THE INVENTION

The present invention generally relates to innerseals of the type which seal over a container opening and which are disposed under a cap. More specifically, the present invention relates to a system for applying an innerseal to seal over a container opening in combination with a seal securable in a cap.

Seals are known which are made of a pulpboard layer and a foil layer, with a wax layer inbetween. Such "waxbond" seals are used, for example, on ketchup bottles. In such prior art seals, the seal is inserted into a cap, pulpboard side first. The cap is then tightened over the mouth of the container so that the foil side contacts against a lip of the container opening. Through a heat induction process, the foil is adhered to the lip by a heat-activatable adhesive, and the wax melts. Desirably, most of the melted wax is absorbed by the pulpboard so that the pulpboard layer and foil layer are separated or easily separatable.

A consumer who opens the container for the first time removes the cap, which retains the pulpboard layer inside, thereby separating the pulpboard layer from the foil layer. The foil layer may then be peeled from the container opening to access the container contents. The waxed pulpboard in the cap then subsequently acts as a seal when the cap is tightened after each use.

Unfortunately, conventional waxed pulpboard backing is not completely resistant to liquids. For instance, after the foil is removed, the waxed pulpboard is directly exposed to the container's contents. If the pulpboard has any defects, such as where it is incompletely waxed, liquid contents; e.g., ketchup, fruit juice, etc.; might be absorbed by the pulpboard, causing the pulpboard to degrade and weaken.

Furthermore, pulpboard seals, which generally are of beer coaster stock thickness, may shear or tear when the cap is tightened or loosened. Liquid-soaked pulpboard is especially susceptible to this.

Also, conventional pulpboard is difficult to cleanly cut with a die. This impedes manufacturing efficiency and creates undesired dust in the manufacturing environment.

Therefore, it is desirable to provide an improved layered seal having a cap backing portion and a foil portion with a wax bond inbetween wherein the cap backing portion is strong and resistant to tearing, resistant to liquids, and cleanly cuttable by a die.

SUMMARY OF THE INVENTION

The present invention solves the aforementioned problems associated with waxed pulpboard seals by providing an innerseal for sealing over a container opening coverable by a cap. The inner seal includes a porous synthetic backing layer, a foil layer, and a wax layer between the backing layer and the foil layer. The wax layer is meltable to flow into the backing layer. This leaves the backing layer and foil layer easily separatable from each other. However, prior to melting, the wax layer holds the backing layer and foil layer together.

The porous synthetic backing layer is preferably made of a resilient polymer foam material such as polyethylene or polyolefin. Moreover, the backing layer includes a plurality of pores, each pore preferably having a diameter of approximately 0.060 inches. The pores may be spaced from each other by a distance between approximately 0.125 to 0.250 inches.

The wax is melted by irradiating the innerseal so that the foil heats up. According to a further aspect of the present invention, a heat-activatable adhesive layer may be disposed against the foil layer opposite the wax layer to contact against a lip of the container opening. This adhesive layer is pressed between the foil and the lip when the cap is tightened. The adhesive layer is heated to sealably secure the foil around the container opening. Therefore, the foil heating process to heat the wax may also heat the adhesive.

The present invention further includes a method for sealing a container with such an inner seal.

An advantage of the present invention is to provide a backing layer which allows reliable re-sealing of the container by tightening the cap. More specifically, after the foil layer has been removed by a consumer, the container may be re-sealed by tightening the cap onto the container so that the backing layer is pressed against the container lip. The synthetic backing layer is resistant to tearing or shearing, providing a more reliable seal than conventional pulpboard seals. The synthetic backing layer is resistant to liquids, further prolonging its integrity. Moreover, the backing layer is compressible and resilient to provide a secure contact against the container lip.

A further advantage of the present invention is that the foil layer acts as a tamper indicator.

Additional features and advantages of the present invention are described in, and will be apparent from, the detailed description of the presently preferred embodiments and from the drawings.

BRIEF DESCRIPTION OF THE DRAWINGS

FIG. 1 is an exploded perspective view of an innerseal according to the present invention.

FIG. 2 is a top plan view of a synthetic backing layer according to the present invention.

FIG. 3 is a sectional side view of an innerseal according to the present invention within a cap, prior to melting the wax layer.

FIG. 4 is a fragmentary sectional side view of a container, cap and innerseal according to the present invention after melting of the wax layer and adhering the foil layer to a lip of the container.

DETAILED DESCRIPTION OF THE PRESENTLY PREFERRED EMBODIMENTS

Referring to FIGS. 1 and 3, an innerseal 10 is provided which includes a synthetic backing layer 12, a wax layer 14 and a foil layer 16. In an initial form, the wax layer 14 lies between the foil layer 16 and backing layer 12, holding the innerseal 10 together. Also, in a preferred embodiment, an adhesive layer 18 is disposed against the foil layer opposite the wax layer 14.

In FIGS. 1–4, it should be noted that dimensions may be exaggerated so that various layers of the seal are illustrated more clearly. For example, the wax, foil and adhesive layers 14, 16 and 18, respectively, may be shown thicker in proportion than actual dimensions.

The backing layer 12 is made of a resilient, compressible synthetic material, preferably a thermoplastic such as polyethylene (high or low density) or polyolefin foam. Other suitable thermoplastic materials may include, but are not limited to, polypropylene, ethylene propylene copolymer, polyolefin elastomer foam, such as EPDM (ethylene-propylene-dienemonomer-type) or EPR (ethylene-propylene-monomer-type) rubber, or copolymers of olefins with comonomers such as ethylene vinyl acetate. As illustrated in FIG. 2, the backing layer 12 preferably has a plurality of perforated holes or pores 20 formed therein. The pores or perforations 20 are each preferably approximately 0.060 inches in diameter and spaced from each other by between about 0.125 to 0.250 inches. The pores may be provided in a repeating pattern, as illustrated. This material is easily cut into a desired shape, such as disk. In a cutting process with a die cutter, the backing layer disks 12 may be cut with virtually no dust.

To form the innerseal 10, the wax is applied to a side of the foil 16. The wax-coated foil layer 16 is then "nipped" or pressed with rollers onto the backing layer 12 to form a layered sheet. Individual seals 10 are then stamped or die-cut from the sheet.

The innerseal 10 is initially provided in an integral manner for ease of handling. As shown in FIG. 3, the integral innerseal 10 is sized to fit snugly into a cap 22 with an interference fit. Optionally, an adhesive may be applied between the backing layer 12 and the cap 22 so that the backing layer 12 is secured therein.

During a manufacturing process, the cap 22 is tightened onto a container 24. Threads 26, 28 on the cap 22 and container 24, respectively, engage each other to hold the cap 22 in place. This presses the foil layer 16 of the still-integral innerseal 10 against a lip 30 of the container 24.

At this point, a heat-induction process may be used to heat the foil layer 16 which, in turn, heats and melts the wax layer 14. The heated foil layer 16 also activates the heat-activatable adhesive layer 18, which bonds the foil layer 16 to the lip 30.

As the wax layer 14 is heated, it melts into liquid form and is absorbed into the backing layer 12 through the pores 20. The wax may be a naturally-occurring wax such as paraffin, carnauba or bees wax, or a microcrystalline synthetic wax, such as a low molecular weight polyolefin wax, however, any suitable wax may be used. The absorbed wax then cools and solidifies within the backing layer 12, forming the wax-absorbed backing layer indicated as 12'. Subsequently, when a consumer removes the cap 22, the backing layer 12' stays with the cap 22 and separates from the foil layer 16. The foil layer 16 remains securely sealed over the container opening as a tamper-indicating safety and freshness seal. To access a product within the container 24, the consumer then simply peels or tears the foil layer 16 away from the container lip.

The adhesive layer 18 may be made of any suitable heat-activatable adhesive material which has a bonding strength sufficient for sealing. For example, the adhesive may be a thermoplastic such as polypropylene, carboxylic anhydride modified, polyvinyl alcohol, high density polyethylene, medium density polyethylene, low density polyethylene, linear low density polyethylene, ultra low density polyethylene, very low density polyethylene, high molecular weight high density polyethylene, ethylene vinyl acetate, homopolymer polypropylene, ethylene/propylene copolymer, ionomer, ethylene-methyl acrylate, ethylene acrylic acid, modified polyesters or modified vinyl (such as the composition known as PETAFLEX® modified vinyl available from National Starch and Chemical Corp.). It might be desired that the adhesive 18 is weak enough to allow the foil layer 16 to peel from the lip 30 undamaged. On the other hand, for tamper-indicating purposes, it might be desirable to provide the adhesive 18 of such a strength that the foil layer 16 tears at the lip 30.

After the composite layer including the foil layer 16 and adhesive layer 18 has been removed and disposed of, the wax-absorbed backing layer 12' re-seals against the lip 30 each time the cap 22 is tightened onto the container 24. The synthetic material of the backing layer 12, 12' resists liquids, such as the container contents or condensation, so that the integrity of the seal does not degrade, nor does the backing layer 12, 12' weaken in strength. This provides an advantage over conventional cap seals made of pulpboard which are susceptible to tearing, especially if wet. The wax further enhances the sealability and liquid-resistance of the backing layer 12'.

Also, the resilient and compressible properties of the preferred foam material used for the backing layer 12, 12' allow it to uniformly contact against the lip 30 even where slight irregularities might be present in the shape of the lip 30. This gives an additional advantage over conventional pulpboard backing layers which are not so resilient.

It should be understood that various changes and modifications to the presently preferred embodiments will be apparent to those skilled in the art. Such changes and modifications may be made without departing from the spirit and scope of the present invention and without diminishing its attendant advantages. Therefore, the appended claims are intended to cover such changes and modifications.

What is claimed is:

1. An innerseal for sealing over a container opening coverable by a cap and for providing a reusable seal between an underside of the cap and the container opening, the inner seal comprising:

a perforated synthetic foam backing layer attached to the underside of the cap;

a foil layer removably attached to the container opening; and a wax layer between the backing layer and the foil layer, the wax layer being meltable to infuse into the perforated backing layer so that the backing layer and foil layer are separable and so that the infusion of the wax into the perforated backing layer converts the perforated backing layer into a reusable seal between the underside of the cap and the container opening, and wherein, prior to melting, the wax layer holds the backing layer and foil layer together.

2. The innerseal according to claim 1, wherein the perforated synthetic foam backing layer includes a plurality of perforations, each perforation having a diameter of approximately 0.060 inches.

3. The innerseal according to claim 1, wherein the perforated synthetic foam backing layer includes a plurality of perforations which are spaced from each other by a distance between approximately 0.125 to 0.250 inches.

4. The innerseal according to claim 1, wherein the porous synthetic foam backing layer is made of a resilient compressible thermoplastic foam material selected from a group consisting of: polypropylene, ethylene propylene copolymer, or polyolefin elastomer foam such as ethylene-propylene-dienemonomer-type or ethylene-propylene-monomer-type rubber, or copolymers of olefins with comonomers such as ethylene vinyl acetate.

5. The innerseal according to claim 1, wherein the wax layer is made of a material selected from a group consisting of: paraffin, carnauba or bees wax or a low molecular weight polyolefin wax.

6. The innerseal according to claim 1, further comprising:

a heat-activatable adhesive layer disposed against the foil layer opposite the wax layer.

7. The innerseal according to claim 6, wherein the heat-activatable adhesive layer is made of a thermoplastic material selected from a group consisting of: polypropylene, carboxylic anhydride modified, polyvinyl alcohol, high density polyethylene, medium density polyethylene, low density polyethylene, linear low density polyethylene, ultra low density polyethylene, very low density polyethylene, high molecular weight high density polyethylene, ethylene vinyl acetate, homopolymer polypropylene, ethylene/propylene copolymer, ionomer, ethylene-methyl acrylate, ethylene acrylic acid, modified polyesters or modified vinyl.

8. The innerseal according to claim 1, wherein the backing layer is sized to be snugly receivable within a cap.

9. A method for sealing a container opening coverable by a cap, the cap having an underside, the method comprising the steps of:

positioning an innerseal between the container opening and the underside of the cap, the innerseal including a resilient and compressible synthetic perforated foam backing layer, a foil layer, and a wax layer between the backing layer and the foil layer;

tightening the cap against the perforated backing layer to press the foil layer against a lip of the container opening and to attach the perforated backing layer to an underside of the cap; and melting the wax so that at least some of the wax is absorbed into perforations in the backing layer thereby converting the perforated backing layer into a reusable seal between the underside of the cap and the container opening.

10. The method according to claim 9, wherein the innerseal further includes a heat-activatable adhesive disposed against the foil layer opposite the wax layer, the method further comprising:

heating the heat-activatable adhesive to adhere the foil layer against a lip of the container opening.

11. The method according to claim 9, wherein the backing layer is approximately the same size as the interior of the cap so that the backing layer is held within the cap by an interference fit.

12. The method according to claim 9, wherein an upper side of the backing layer is coated with an adhesive so that the backing layer will adhere to the underside of the cap after completion of the tightening step.

13. The method according to claim 9, wherein the underside of the cap is coated with an adhesive so that the backing layer will adhere to the cap after completion of the tightening step.

\* \* \* \* \*